(12) United States Patent
Hoiness et al.

(10) Patent No.: US 8,023,997 B2
(45) Date of Patent: Sep. 20, 2011

(54) NETWORK INTERFACE WIRELESS ROUTER

(75) Inventors: Stuart E. Hoiness, Hickory, NC (US);
John J. Napiorkowski, Irving, TX (US);
Kathleen E. Blake, Keller, TX (US);
Boyd G. Brower, Keller, TX (US); Tuy T. Nguyen, Euless, TX (US)

(73) Assignee: Corning Cable Systems LLC, Hickory, NC (US)

( * ) Notice: Subject to any disclaimer, the term of this patent is extended or adjusted under 35 U.S.C. 154(b) by 1415 days.

(21) Appl. No.: 11/513,941

(22) Filed: Aug. 31, 2006

(65) Prior Publication Data

US 2008/0056224 A1 Mar. 6, 2008

(51) Int. Cl.
*H04W 88/02* (2009.01)
(52) U.S. Cl. ...................................... 455/557
(58) Field of Classification Search .............. 370/217, 370/254, 329, 401, 331, 338, 342, 350, 352, 370/392, 395.3; 340/815.45; 713/2; 714/752, 714/755, 725; 709/202; 455/3.06, 415, 456.3, 455/426.1, 557, 575.1; 725/48
See application file for complete search history.

(56) References Cited

U.S. PATENT DOCUMENTS

| | | | | |
|---|---|---|---|---|
| 5,751,789 A | | 5/1998 | Farris et al. .................. 379/34 |
| 5,790,631 A | | 8/1998 | Minarczik et al. .............. 379/2 |
| 5,877,565 A | * | 3/1999 | Hollenbach et al. ......... 307/119 |
| 5,930,704 A | * | 7/1999 | Kay .............................. 455/419 |
| 6,181,954 B1 | * | 1/2001 | Monroe et al. ............... 455/557 |
| 6,493,875 B1 | | 12/2002 | Eames et al. .................. 725/81 |
| 6,560,334 B1 | * | 5/2003 | Mullaney et al. ......... 379/413.04 |
| 6,647,015 B2 | | 11/2003 | Malkemes et al. ............ 370/401 |
| 6,741,781 B2 | * | 5/2004 | Furuyama ..................... 385/129 |
| 6,978,474 B1 | | 12/2005 | Sheppard et al. ............... 725/83 |
| 7,146,180 B1 | * | 12/2006 | Liu ................................ 455/465 |
| 2002/0111077 A1 | * | 8/2002 | Keenum ........................ 439/676 |
| 2005/0018653 A1 | * | 1/2005 | Phillips et al. ................ 370/352 |
| 2006/0209857 A1 | | 9/2006 | Hicks, III ...................... 370/401 |
| 2008/0132188 A1 | * | 6/2008 | Nino et al. .................. 455/187.1 |
| 2009/0003221 A1 | * | 1/2009 | Burns et al. ................... 370/241 |
| 2009/0013210 A1 | * | 1/2009 | McIntosh et al. ................. 714/4 |

FOREIGN PATENT DOCUMENTS

| | | |
|---|---|---|
| EP | 1128651 | 8/2001 |
| WO | WO 00/67458 | 11/2000 |
| WO | WO 01/56233 | 8/2001 |

OTHER PUBLICATIONS

Patent Cooperation Treaty, International Search Report for International Application No. PCT/US2007/019203, May 14, 2008, 3 pages.
Wilson, C., New technology bridges wireless, wireline, Dec. 28, 2005; http://telephoneonline.com/broadband/news/Home_networking_technology_122805/.

* cited by examiner

*Primary Examiner* — Diane Mizrahi
(74) *Attorney, Agent, or Firm* — John H. Vynalek

(57) ABSTRACT

There is provided an apparatus and methodology for providing selective wired and/or wireless transmission of communications signals to and/or within a subscriber premises. A network interface device includes a wireless router within the housing of the network interface device to selectively provide one or more of wireless and wired communications services to a subscriber. The network interface device may be mounted externally of a subscriber premises. The provision of a wireless router within a network interface device offers a service provider the ability to provide wireless service to a subscriber as well as to new subscribers in close proximity to a subscriber.

14 Claims, 3 Drawing Sheets

US 8,023,997 B2

NETWORK INTERFACE WIRELESS ROUTER

FIELD OF THE INVENTION

The present invention relates generally to the provision of a wireless router for use at a subscriber premises. More particularly, the present invention relates to a wireless router that may be associated with a network interface device (NID) and configured to provide wireless signal transmission between an outside line and a subscriber's premises equipment.

BACKGROUND OF THE INVENTION

As telephone companies migrate to higher bandwidth services including data and video offerings, the desire to add convenience or utilize technical advances in new and unique ways increases. VoIP is a term that has become well recognized recently and relates to methodologies for converting analog audio signals into digital data that may be transmitted over the Internet or other digital data transmission networks including, for example, enterprise intranet networks.

Plain Old Telephone Service (POTS) has been in use for some time and, because of its relatively low operating frequencies, operates very compatibly with more recently introduced, concurrently provided, Digital Subscriber Line (DSL) services. DSL service may be provided in a number of configurations that collectively have been designated as "xDSL" to denote all of the various forms. A more common type generally deployed to residential subscriber's premises carries the designation of Asymmetric Digital Subscriber Line (ADSL) service.

More recently, DSL service has been proposed to be provided exclusively over the communications lines previously shared with POTS. This data without POTS (also sometimes referred to as "naked DSL") continues to work well using the same communications lines previously shared with POTS.

In addition to the above, coaxial cable has been used for many years to bring media signals in the form of television programming to various premises both residential and commercial. More recently such coaxial cables have been employed to provide data services along with the previously supplied media programming.

Most recently, optical fiber has been deployed to these same residential and commercial locations with the promise of providing some or all of the services previously and currently provided by both copper lines and coaxial cables and providing such services while at the same time providing vastly increased bandwidth capabilities.

In view of the above mentioned issues involving the provision of various services at a subscriber premises, it would be desirable to have an electronics package that provides the subscriber with the option of continuing to use her premises wiring including copper and cable and to provide additional capabilities without having to install any additional in premises transmission medium. While various adapter configurations have been developed, no design has yet emerged that generally encompasses all of the desired characteristics, as hereafter presented in accordance with the present invention.

SUMMARY OF THE INVENTION

In view of the recognized deficiencies encountered in the prior art and addressed by the present invention, the present invention provides an improved network interface device (NID) apparatus for providing signal coupling from various transmission mediums deployed to a subscriber premises.

In one embodiment of the present invention, a NID apparatus is provided that enables a subscriber to obtain DSL services at her premises while retaining use of existing analog POTS equipment.

In a simple form, signal coupling electronics are provided for mounting in a network interface device, as may commonly be provided at a subscriber premises.

Another positive aspect of this type of adapter is that varying signal coupling electronics may be provided in correspondence to the type(s) of communication signal transmission carriers or mediums deployed to a subscriber premise.

In accordance with further embodiments of the present invention, an apparatus is provided to enable expanded signal transmission within a subscriber premise without having to install additional signal transmission medium within a subscriber premise.

In accordance with still further embodiments of the present invention, an apparatus is provided to enable wireless transmission of selected signals within a subscriber premise.

In accordance with additional embodiments of the present invention, an apparatus has been developed to provide a subscriber with wireless services while also permitting the subscriber to implement various services using her existing home wiring.

Additional objects and advantages of the present invention are set forth in, or will be apparent to those of ordinary skill in the art from, the detailed description herein. Also, it should be further appreciated that modifications and variations to the specifically illustrated, referred and discussed features and elements hereof may be practiced in various embodiments and uses of the invention without departing from the spirit and scope of the disclosure. Variations may include, but are not limited to, substitution of equivalent means, features, or steps for those illustrated, referenced, or discussed, and the functional, operational, or positional reversal of various parts, features, steps, or the like.

Additional features and advantages of the invention will be set forth in the detailed description which follows, and in part will be readily apparent to those skilled in the art from that description, or recognized by practicing the invention as described herein, including the detailed description, which follows, the appended claims, and the accompanying drawing figures.

It is to be understood that both the foregoing general description and the following detailed description present exemplary embodiments of the invention, and are intended to provide an overview or framework for understanding the nature and character of the invention as it is claimed. The accompanying drawing figures are included to provide a further understanding of the invention, and are incorporated into and constitute a part of this specification. The drawing figures illustrate various embodiments of the invention, and together with the detailed description, serve to explain the principles and operations thereof. Additionally, the drawing figures and descriptions are meant to be illustrative and not limiting.

BRIEF DESCRIPTION OF THE DRAWINGS

A full and enabling disclosure of the present invention, including the best mode thereof, directed to one of ordinary skill in the art, is set forth in this disclosure, which makes reference to the appended figures, in which.

Figure 1:
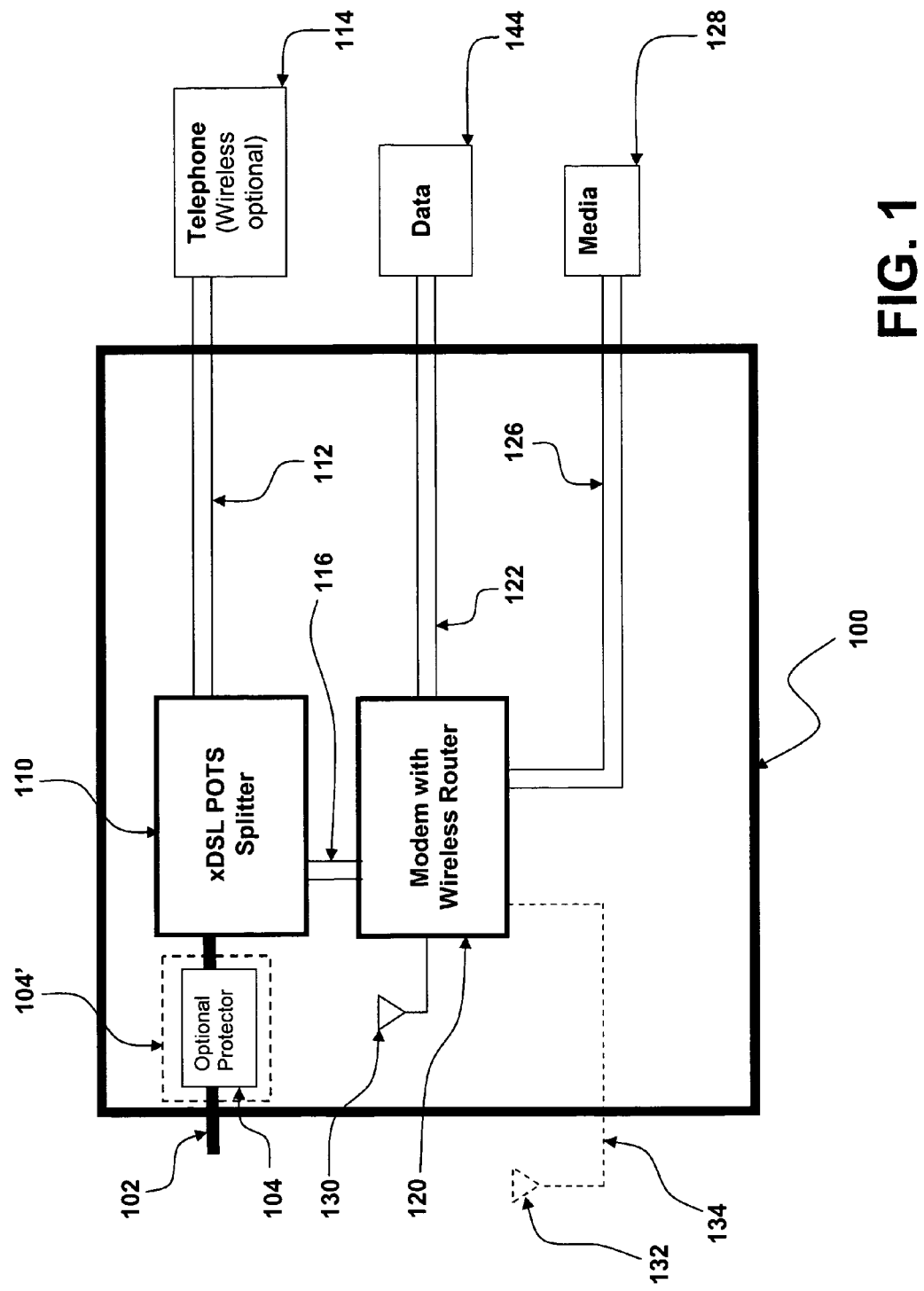
FIG. 1 illustrates an exemplary configuration of a network interface device adapter installation in a residential environment wherein coaxial cable has been deployed as a communications signal carrier to the premises in accordance with a first embodiment of the present invention.

Repeat use of reference characters throughout this written disclosure and the appended drawings is intended to represent the same or analogous features or elements of the invention.

DETAILED DESCRIPTION OF THE PREFERRED EMBODIMENTS

As previously discussed, the present invention is particularly concerned with providing improved network interface device (NID) apparatus for providing signal coupling from various communications signal carriers deployed to a subscriber premises.

Selected combinations of aspects of the present invention correspond to a plurality of different preferred embodiments. It should be noted that each of the exemplary embodiments presented and discussed herein should not insinuate limitations of the present invention. Features or steps illustrated or described as part of one embodiment may be used in combination with aspects of another embodiment to yield still further embodiments. Additionally, certain features may be interchanged with similar devices or features not expressly mentioned which perform the same or similar function.

Reference will now be made in detail to the presently preferred embodiments of a network interface device electronics package according to the present invention. Referring now to the drawings, FIG. 1 illustrates an exemplary configuration of a network interface device (NID) 100 installation in a residential environment wherein coaxial cable 102 has been deployed to the premises in accordance with a first embodiment of the present invention. NID 100, constructed in accordance with the present invention, may take multiple forms based on specific subscriber and service supplier requirements. In all cases, NED 100 may be installed at a subscriber premises and will be variously enabled depending, in part, on the type of service connection provided to the subscriber premises by the service provider.

In certain instances, selected components designed for mounting within NID 100 may be provided in a form allowing a subscriber to install the components herself as disclosed in commonly-assigned pending U.S. patent application Ser. No. 11/439,086 entitled "VoIP ADAPTER FOR NETWORK INTERFACE DEVICE" filed May 23, 2006. In such instances, the components may be mailed to a subscriber as a kit for self-installation.

In accordance with the present invention, different situations may arise resulting from the methodology by which the service provider provides service at a subscriber's premises. In particular, the transmission medium provided by the service provider as well as the particular set of services provided may give rise to differing configuration requirements for NID 100. In all cases, however, certain commonalties of capabilities will exist as will be described more fully later.

With further respect to the exemplary embodiment of the present invention as illustrated in FIG. 1, service may be provided to a subscriber's premises by way of a coaxial cable 102. In the instance that the service provider is to provide telephone, data and media services to the subscriber's premises, it will be necessary to provided electronics within NED 100 to separate the various signals impressed on coaxial cable 102 so that the individual services may be accessed.

As illustrated in FIG. 1, NID 100 may be configured to receive a coaxial cable 102 by way of a suitably configured entry port in NID 100. Coaxial cable 102 may be coupled to additional electronic devices housed within NID 100 by way of an optional protector 104. Optional protector 104, which may be housed within a schematically illustrated separate chamber 104' within NID 100, may correspond to a variety of transient suppression devices or a combination of such devices designed to protect NID 100 electronics from damage resulting from electrical surges induced by, for example, lightning or other transient producing phenomena. Additional protection components including, but not limited to, fuses, gas tubes with or without failsafe, sidactors, positive temperature coefficient (PTC) or fusible resistors, may be added into the circuit design to provide additional secondary protection and improve performance. Any combination of these components could be used to meet certain requirements. In order to meet more stringent requirements, combinations of any of the above named components may be used. Protective elements as here described may be coupled in various combinations as line to line, and line to ground including both tip to ground and ring to ground configurations as is well understood by those of ordinary skill in the art.

Regardless of whether optional protector 104 is provided, signals transmitted over cable 102 may be coupled to an xDSL POTS Splitter 110 mounted within NID 100. As will be understood by those of ordinary skill in the art, xDSL POTS Splitter 110 may be provided to separate the various forms of Digital Subscriber Line (DSL) signals, commonly generically referred to as xDSL signals, from the Plain Old Telephone Service (POTS) signals as may be commonly impressed with xDSL signals on coaxial cable 102. POTS signals may then be provided over cable 112 to telephone equipment 114 as may be provided in the subscriber's premises.

In certain instances, service providers may supply xDSL data service without POTS to a subscriber's premises. In such instances the need to provide line protective sealing current for those subscribers interested in continuing use of their existing analog POTS equipment requires inclusion of additional electronics to isolate the higher frequency that would otherwise be impressed on the subscriber premises wiring and which would be degraded by coupling of analog POTS equipment directly to the premises wiring. Such additional electronics is described, for example, in the commonly-assigned copending U.S. patent application Ser. No. 11/439, 087 entitled "xDSL VoIP ADAPTER DEVICE" filed on May 23, 2006.

Referring further to the exemplary embodiment of the present invention illustrated in FIG. 1, there is illustrated a further electronics component coupled by cable 116 to an output of xDSL POTS Splitter 110. This further component is designated in FIG. 1 as a modem with wireless router and will be herein after described as wireless router 120. Wireless router 120 corresponds to a significant aspect of the present invention in that through the provision of wireless router 120 within NID 100, significant cost savings as well as installation savings in both time and effort may be achieved.

Wireless router 120 may be configured to optionally provide signals over cables 122 that may be coupled via subscriber premises cables to a data using device 144. Such data using device 144 may correspond to one or more personal computers coupled together, for example, by way of an un-illustrated home network. In addition, wireless router 120 may optionally provide signals over cable 126 to be couple to additional subscriber premises cables to media device 128. Media device 128 may correspond to a television receiver, a video recorder, or other device capable of displaying, saving, or otherwise manipulating media signals as may be provided by a service provider over cable 102. Cable 122 may correspond to a commonly used "category 5" (CAT 5) cable or other type cable while cable 126 may correspond to a coaxial cable or other suitable cable type.

In addition to the optional provision of data and media signals by way of cables 122, 126 and in accordance with the present invention, wireless router 120 may be configured to provide wireless signals directly from NID 100 to the subscriber premises. Optionally the voice portion of signals received over cable 102 and transmitted by cables 112 to telephone equipment 114 may also or alternatively be transmitted over a wireless link.

By directly transmitting wireless signals from wireless router 120 installed in NID 100, as well as NIDs 200 and 300 to be described later, a service provider may avoid the time and expense of installing copper wire, coaxial cable or fiber optic cable within a subscriber's premises while maintaining the ability to provide various service options to the subscriber. Moreover, by providing a wireless router within a subscriber NID 100, 200, and/or 300 a service provider may be able to provide service to additional nearby subscribers without the need to actually install additional NIDs. Such instances may involve locations in an apartment complex, housing developments or businesses.

This aspect of the present invention has particular importance in retrofit applications where no prior data, media, or even POTS wiring may exist in a particular subscriber's premises. In addition, wireless router 120 can serve any wireless device including, but not limited to, Settop Box, Computer, Modem, Soft Phone, Digital Phone, Phone Base Station, Router, Intelligent Appliances, Burglar Alarm, etc.

It should be borne in mind that while retrofit applications of the present invention may provide clear advantages, the present invention may none-the-less have utility in virtually any location. For example, some amount of data or media cable may be installed in a subscriber's premises yet additional use locations within, around or near the premises may be desired. Such desires may more easily be addressed by the provision of a wireless connection where, in fact, it may be impossible or at least difficult to install otherwise required cables.

With further reference to FIG. 1, it will be noticed that the wireless aspects of wireless router 120 may be supported through the provision of an antenna 130 mounted internal to NID 100. Moreover, one or more optional or alternative antenna(e) 132 may be mounted externally of NID 100 to operate in conjunction with internal antenna 130 as, for example, a component of a diversity system embodied within wireless router 120 or as the sole antenna for the system. Antenna 132 may be mounted directly to an external portion of NID 100 or may be mounted remotely from NID 100, perhaps at an elevated location, to improve transmission range. In either case, antenna 132 may be coupled to router 120 by way of cable 134 either directly of by way of suitable radio frequency (RF) coupling connectors (not illustrated) mounted externally on NED 100 with a matching connector coupled to a cable connected to antenna 132.

It will be appreciated by those of ordinary skill in the art that, although the features are not herein illustrated, NID 100 should be provided with a lockable security cover but may also have subscriber accessible portions as is commonly provided.

Figure 2:
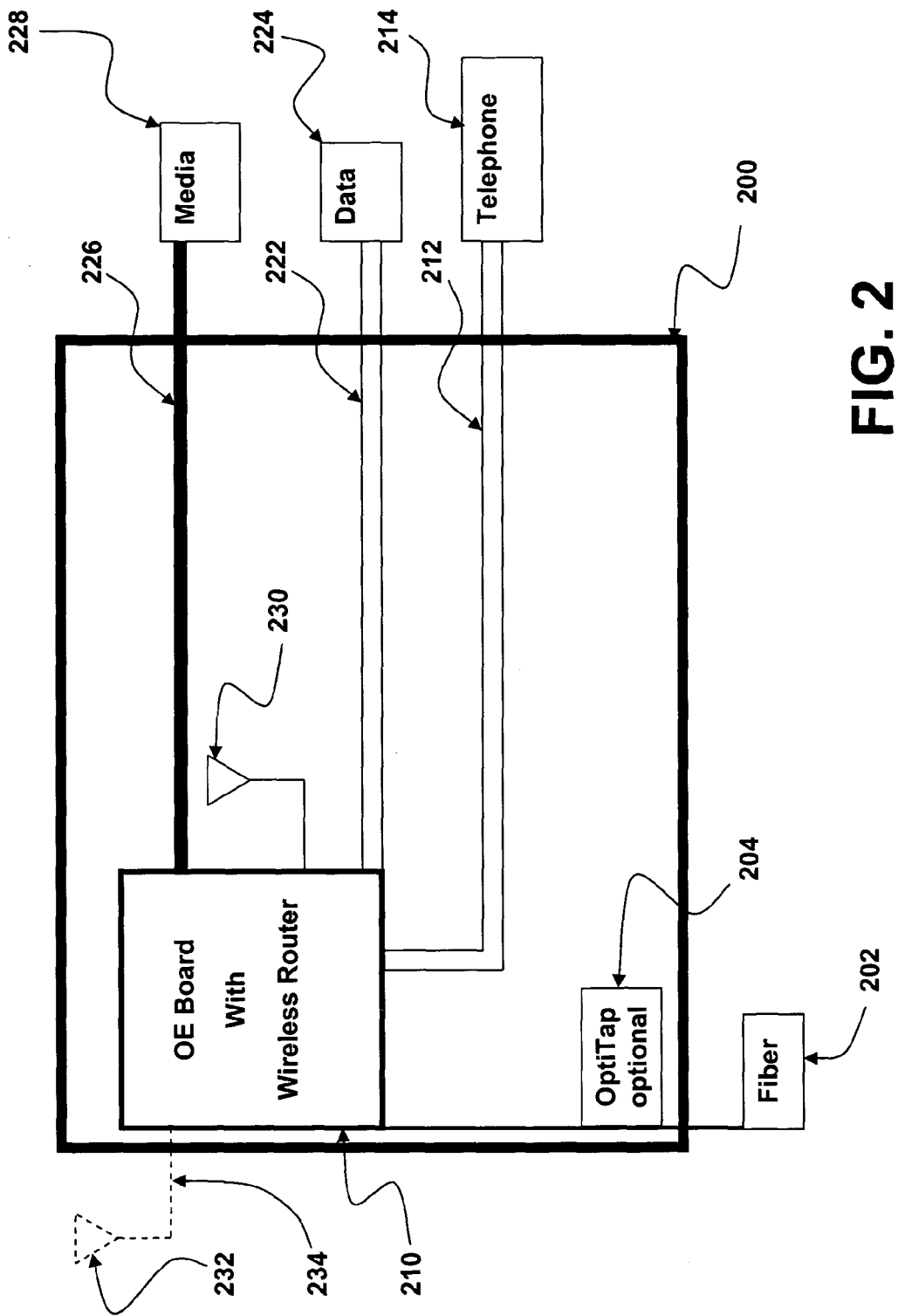
FIG. 2 illustrates an exemplary configuration of a network interface device adapter installation in a residential environment wherein fiber optic cable has been deployed as a communications signal carrier to the premises in accordance with a second embodiment of the present invention.

With reference now to FIG. 2, a second embodiment of network interface device adapter installation in accordance with the present invention will be described. As with the previously described first embodiment, the network interface device adapter installation includes a NID 200 housing an Optical-Electrical (OE) circuit board 210 on which is mounted components whose functions are similar to those of the various components mounted in NED 100 as described with respect to FIG. 1. In particular, OE board 210 is coupled to an incoming fiber optic cable 202 by way of an optional optical tap 204.

OE board 210 includes, in accordance with an important aspect of the present invention, a wireless router similar to that described with respect to the embodiment illustrated in FIG. 1 as well as splitter and wired router components that provide telephone signals over cable 212 to subscriber premises telephone equipment 214; data signals over cable 222 to subscriber premises data equipment 224; and media signals over cable 226 to subscriber premises media equipment 228. Each of these features of this second embodiment of the present invention correspond to the previously discussed like features of the first embodiment and will thus not be further described.

As with the first embodiment, this second embodiment of the present invention may also include one or more NID 200 internal antenna(e) 230 as well as one or more optional external antenna(e) 232 coupled to OE board 210 by way of cable 234 with or without optional connectors mounted to NID 200 as previously described. Each such antenna and associated elements including optional connectors and coupling cables perform the same functions as previously described with respect to the embodiment of FIG. 1.

Figure 3:
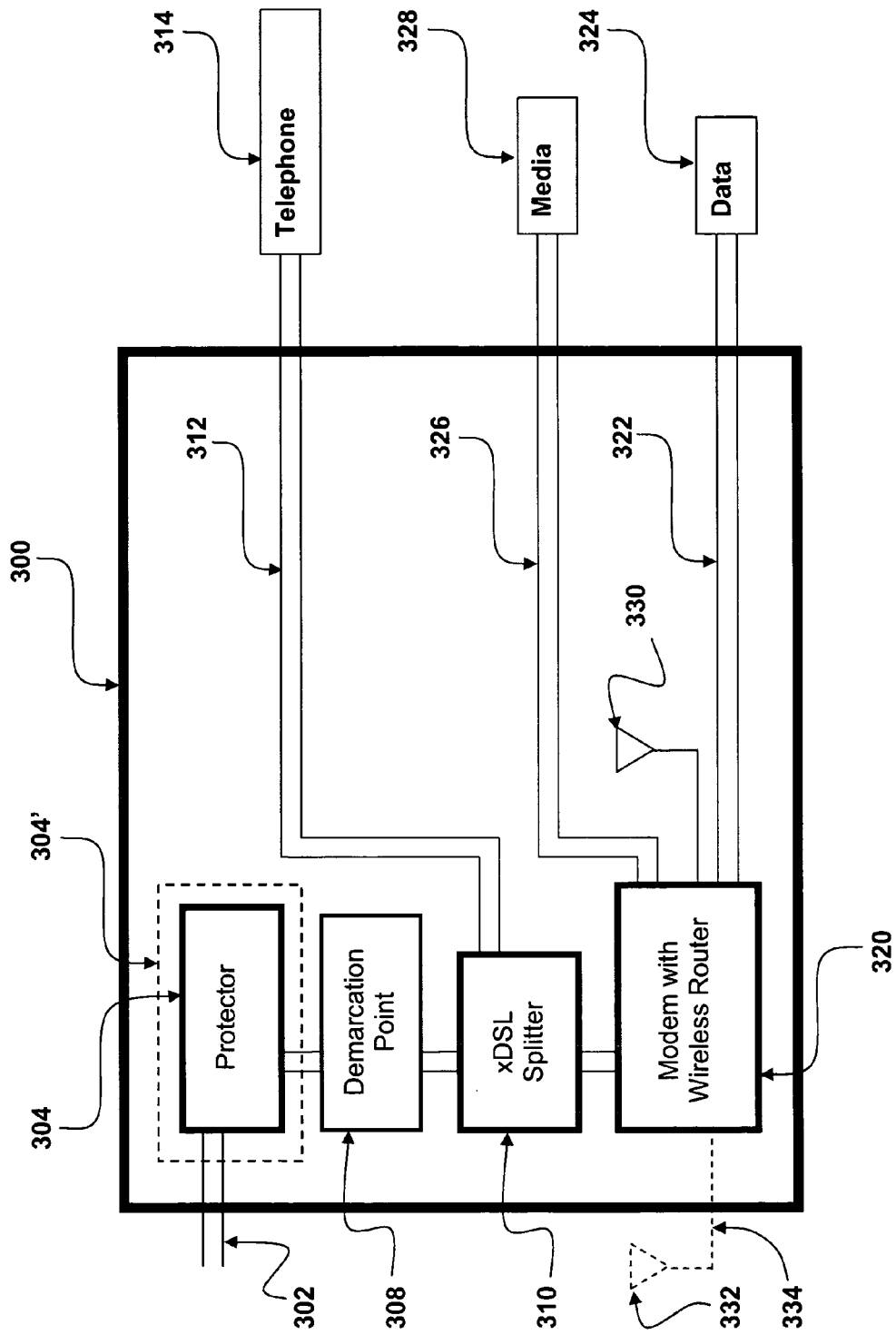
FIG. 3 illustrates an exemplary configuration of a network interface device adapter installation in a residential environment wherein copper cable has been deployed as a communications signal carrier to the premises in accordance with a third embodiment of the present invention.

Referring now to FIG. 3, a third embodiment of network interface device adapter installation in accordance with the present invention will be described. The third embodiment of the present invention corresponds in many respects to the first embodiment illustrated in FIG. 1 in that NID 300 is configured to contain an optional protector device 304 which, like protector 104 of the first embodiment may be separately housed in schematically illustrated separate chamber 304' within NID 300. Moreover optional protector 304 may correspond to the various configuration previously discussed with respect to protector 104.

In addition to these points of similarity with respect to the first embodiment of the present invention, the third embodiment also incorporates an xDSL Splitter 310 and a modem and wireless router combination herein after designated as wireless router 320. Wireless router 320 has all of the functionality of wireless router 120 previously described and includes cable connections as well as antenna connections corresponding to those of the first embodiment and have been given similar reference designations but with "300" series numbers. It should be appreciated that for applications in which POTS is not provided and telephone service is being provided by VoIP, the xDSL Splitter 310 of FIG. 3 is removed and the VoIP information is provided with Data 324 through the Modem with Wireless Router 320.

The third embodiment differs from the previously presented embodiments in at least two respects. First, the various services provided by the service provider arrive at a subscriber's premises by way of a twisted pair copper cable 302. Second, the third embodiment provides a demarcation point 308 that, as well understood by those of ordinary skill in the art, separates portions of NID 300 into a first section accessible to the service provider and a second portion accessible to the subscriber. Although not illustrated herein, the demarcation point itself in an exemplary configuration may correspond to an RJ11 type jack and plug combination although other types of complimentary jacks and plugs or other connectors may be used.

As described with respect to the first embodiment, although not herein illustrated, NID 300 may be configured such that the service provider accessible portion may be secured by suitable locking means while the second portion may be freely accessible to a subscriber. It should be further appreciated that while demarcation point 308 is illustrated as positioned between protector 304 and xDSL Splitter 310, such is not a requirement of the present invention. In fact the demarcation point may be located before, after, or in the middle of the electronics.

While the present invention has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and does not preclude inclusion of such modifications, variations, equivalents and/or additions to the present invention as would be readily apparent to one of ordinary skill in the art.

What is claimed is:

1. A network interface device, comprising:
    a housing located at a subscriber premises;
    a wireless router mounted within said housing; and
    a communications signal carrier coupled to said wireless router,
    whereby a service provider may selectively provide one or more of wireless, and wired communications services to up to at least two subscribers through the network interface device.

2. The network interface device of claim 1, wherein the communications signal carrier is selected from the group consisting of a coaxial cable and a twisted pair cable.

3. The network interface device of claim 1, wherein the communications signal carrier comprises an optical fiber cable.

4. The network interface device of claim 1, further comprising a modem mounted within said housing and coupled to said wireless router.

5. The network interface device of claim 1, further comprising a digital subscriber line (xDSL) splitter coupled between said communications signal carrier and said wireless router.

6. The network interface device of claim 5, wherein said xDSL splitter is configured to provided communications signals to said wireless router and to subscriber plain old telephone system (POTS) equipment.

7. The network interface device of claim 1, further comprising an antenna coupled to said wireless router and mounted within said housing.

8. The network interface device of claim 1, further comprising an antenna coupled to said wireless router and mounted externally of said housing.

9. The network interface device of claim 1, further comprising a protector coupled to said communications signal carrier, thereby providing protection from transient electrical phenomena.

10. The network interface device of claim 9, wherein said protector is enclosed in a separate housing within said housing.

11. The network interface device of claim 1, further comprising a demarcation point coupled between said communications signal carrier and said wireless router.

12. The network interface device of claim 1, wherein said wireless router is configured to provide one or more of data and media signals by way of wired connections to subscriber equipment.

13. A network interface device, comprising:
    a housing;
    an optical-electrical circuit board included within said housing, wherein said optical-electrical circuit board includes a wireless router; and
    an optical fiber cable coupled to said optical-electrical circuit board,
    whereby a service provider may selectively provide one or more of wireless and wired communications services to up to at least two subscribers through the network interface device.

14. The network interface device of claim 13, wherein the housing includes an optical tap through which said optical fiber cable enters said housing of said network interface device.

* * * * *